United States Patent

[11] 3,595,452

| [72] | Inventor | Bernard M. Anderson<br>135 E. Clay St., Monmouth, Oreg. 97361 |
|------|----------|---------------------------------------------------------------|
| [21] | Appl. No. | 841,386 |
| [22] | Filed | July 14, 1969 |
| [45] | Patented | July 27, 1971 |

[54] LOAD-CARRYING RACK FOR TRUCK BODIES AND THE LIKE
1 Claim, 6 Drawing Figs.

[52] U.S. Cl. .................................................. 224/42.1 F, 296/43
[51] Int. Cl. ................................................ B60r 9/04
[50] Field of Search ................................... 224/42.1, 29; 296/104, 43

[56] References Cited
UNITED STATES PATENTS

| 1,507,229 | 9/1924 | Bosley | 296/43 |
| 1,991,900 | 2/1935 | Larsen | 224/42.1 (A) |
| 2,237,853 | 4/1941 | Troche | 224/42.1 E |
| 2,565,746 | 8/1951 | Turner | 296/104 |
| 2,720,414 | 10/1955 | Hart | 224/29 |

Primary Examiner—Gerald M. Forlenza
Assistant Examiner—John Mannix
Attorney—James D. Givnan ABSTRACT: A load carrier in the form of a rack assembly comprising horizontal frame members and means for adjustably securing the frame members to the top of truck bodies such as pickup canopies, pickup campers and similar auxiliary vehicle bodies. The adjustable securing means enables the horizontal frame members to be fixedly secured in various elevated positions relative to the body top and also elongated or retracted for accommodating loads of various widths.

PATENTED JUL 27 1971 3,595,452
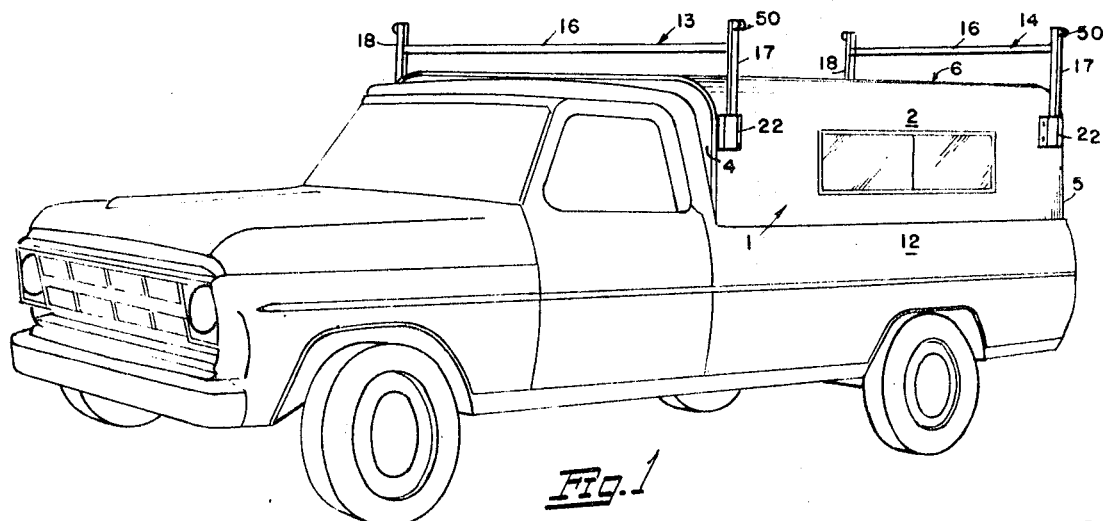
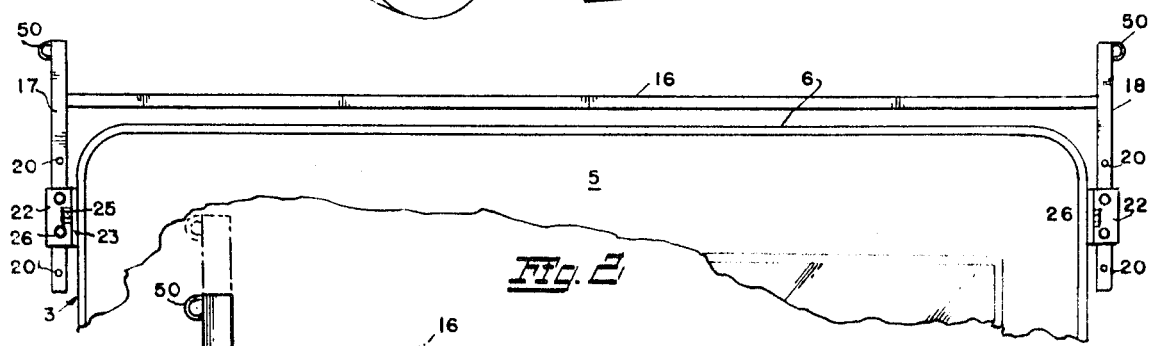
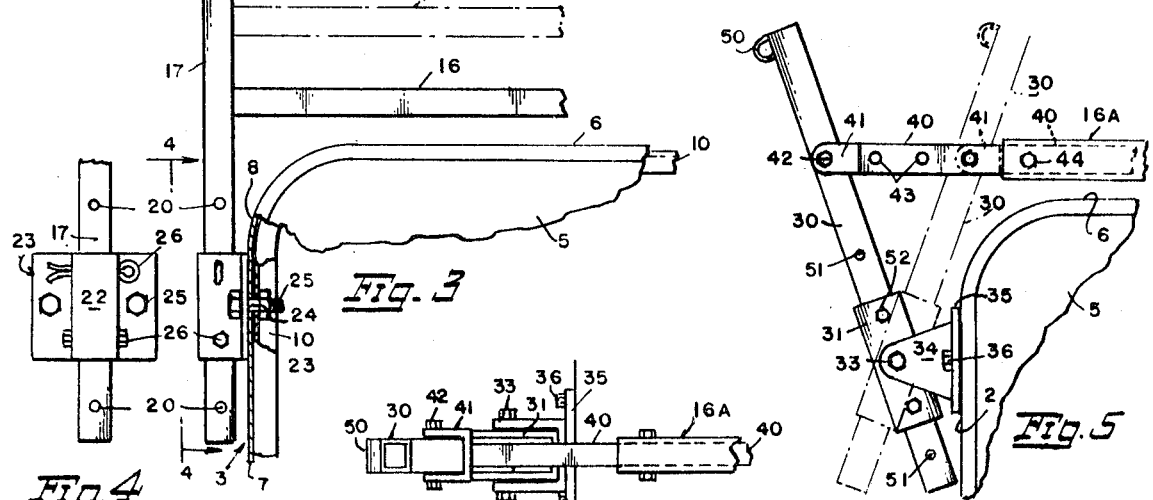
BERNARD M. ANDERSON
INVENTOR.
BY James D. Girman
ATT'Y

3,595,452

LOAD-CARRYING RACK FOR TRUCK BODIES AND THE LIKE

The objects of the invention are:

To provide a load carrier and attaching means, as above pointed out, which are of simple, efficient, durable and inexpensive construction comprising a minimum number of interchangeable parts so assembled that they may be knocked down or taken apart and packed or stored within the vehicle when not in use.

To provide a load carrier wherein the structural components are identical and wherein the four corners of the carriers are adjustable independently of each other to accommodate loads of various configurations in a balanced condition relative to the longitudinal and transverse axes of the vehicle.

To provide a load carrier assembly of maximum strength for minimum weight, of strong, compact, lightweight construction which attains all of the foregoing objects, and is efficient in all aspects of highway vehicle operation and which serves to transport increased payloads within highway length and weight requirements.

To provide a load carrier which meets all the requirements of efficient engineering and practical use.

The foregoing and other objects and advantages which will become subsequently apparent reside in the details of construction and operation as more fully hereinafter described and claimed, reference being had to the accompanying drawing forming a part thereof and in which:

FIG. 1 is a perspective view of a pickup truck and canopy provided with a load-supporting rack made in accordance with my invention.

FIG. 2 is an elevational view of one of the two identical assembled components of the rack.

FIG. 3 is an exemplary detail view on an enlarged scale of one of the four identical corners of means mounting the rack components to the sidewalls of the canopy.

FIG. 4 is a side elevational detail view taken approximately along the line 4—4 of FIG. 3.

FIG. 5 is a view similar to FIG. 3 showing a modified form of the invention.

FIG. 6 is a fragmentary top plan view of FIG. 5.

With continuing reference to the drawing wherein like reference numerals designate like parts and particularly FIGS. 1—3 thereof, numeral 1 indicates generally a conventional truck body canopy having windowed sidewalls 2, 3, front and rear walls 4, 5, and a top wall 6.

The sidewalls 2, 3 and top wall 6 are preferably, though not restrictively, made of sheet metal 7 (FIG. 4), with the sidewalls merging into the top wall on the approximate radius of curvature 8 of channel sections or the like as at 10, whose bottom ends are removably secured to the sides 12 of the truck body in any suitable manner.

Since the front and rear rack frames, indicated generally at 13 and 14 respectively, and their related parts and means for mounting the frames to the truck canopy are identical, a description of one frame will suffice for both.

Each frame consists of an elongated hollow square section 16 welded at both of its ends to perpendicular members 17, 18 also made of elongated hollow square section having apertures 20 therethrough at any desired spaced intervals as shown.

As best illustrated in FIG. 3, each perpendicular end member is carried by, and vertically adjustable relative to, a supporting bracket 22 also of hollow square section welded to a backing plate 23 apertured as at 24 for the passage therethrough of anchor bolts 25 for firm securement to the channel sections 10 of the canopy.

From the foregoing it will be apparent that the longitudinal members 16 of the frames 13, 14 may be raised or lowered relative to the top 6 of the canopy by selective placement of bolts or cotter pins 26 through the sleeve 22 and the apertures 20 in the perpendicular members.

In the modification illustrated in FIGS. 5 and 6, the perpendicular members 30 are carried by sleeve brackets 31 provided with laterally extending trunnions 33 by means of which the brackets are swingably attached to bracket plates 34 cast integral with a mounting plate 35 secured as at 36 to the sidewalls 2 and 3 of the canopy. This arrangement enables the perpendicular members to be swung outwardly from or inwardly toward the sidewalls of the canopy as shown in full and broken lines respectively.

Into each end of the hollow longitudinal frame members 16A is inserted an extension arm 40 provided with a clevis 41 at its outer end for pivotal attachment as at 42 to its respective perpendicular member 30. Each extension arm is apertured as at 43 for adjustable connection to the longitudinal frame members 16A as at 44 to permit of their elongation or retraction, and hence their perpendicular members, relative to each other and to the camper roof 6 to accommodate loads of various widths. Each frame may be extended or retracted independently of each other.

The top of each of the perpendicular members 17, 18 and 30 is provided with a steel loop or ring 50 for convenience in tying a load by rope or flexible cable to the rack.

The perpendicular members 30 in the modification shown in FIG. 5 are also provided with vertically spaced apertures 51 for vertical adjustment along with their horizontally adjustable frame members 16A by the passage of bolts or cotter pins 52 through the sleeve brackets 31 and the apertures 51 in the perpendicular members.

I claim:

1. A load-carrying rack and means removably securing the rack to the top of a vehicle body having at least two sidewalls and a top wall, bracket mounting plates removably secured, one each to the sidewalls of said vehicle body at the four corners thereof, laterally extending bracket plates carried by said mounting plates, sleeve brackets having spaced-apart openings therethrough lengthwise thereof, normally perpendicular members carried by said sleeve brackets and having spaced-apart apertures therethrough, trunnions carried by said bracket plates and selectively extensible through said sleeve brackets and said normally perpendicular members, horizontally disposed load-supporting members interconnecting said perpendicular members, at least one end of each of said horizontally disposed load-supporting members having an extension arm extending outwardly therefrom, means adjustably interconnecting said extension arm and its respective perpendicular member, whereby said horizontally disposed load-supporting members can be fixedly secured in various elevated positions relative to said vehicle body top and also elongated or retracted for accommodating loads of various widths.